United States Patent [19]

Botros

[11] Patent Number: 4,750,937

[45] Date of Patent: Jun. 14, 1988

[54] NON-CRUSTING INK CONTAINING LARGE AMOUNTS OF HUMECTANT

[75] Inventor: Raouf Botros, Centerville, Ohio

[73] Assignee: Eastman Kodak Company, Rochester, N.Y.

[21] Appl. No.: 919,522

[22] Filed: Oct. 16, 1986

Related U.S. Application Data

[63] Continuation-in-part of Ser. No. 883,414, Jul. 8, 1986, which is a continuation-in-part of Ser. No. 860,731, May 7, 1986.

[51] Int. Cl.$^4$ ............................................... C09D 11/02
[52] U.S. Cl. ......................................... 106/22; 106/20
[58] Field of Search .................................... 106/22, 20

[56] References Cited

U.S. PATENT DOCUMENTS

| | | | |
|---|---|---|---|
| 3,846,141 | 11/1974 | Ostergren et al. | 106/22 |
| 3,864,296 | 2/1975 | Faessinger | 8/85 |
| 4,206,493 | 6/1980 | Towne et al. | 362/240 |
| 4,269,627 | 5/1981 | Hwang | 106/22 |
| 4,279,653 | 7/1981 | Makishima et al. | 106/22 |
| 4,285,727 | 8/1981 | Uehara et al. | 106/22 |
| 4,455,168 | 6/1984 | Shimada et al. | 106/22 |
| 4,500,355 | 2/1985 | Shimada et al. | 106/22 |

FOREIGN PATENT DOCUMENTS 60-3434  1/1985  Japan.

OTHER PUBLICATIONS

Derwent Abstract Accession No. 80-40847c/23, Japanese Patent No. 49055425, 5/29/74.
Derwent Abstract Accession No. 79-49912b/27, Japanese Patent No. 54065608, 5/26/79.

*Primary Examiner*—Amelia Burgess Yarbrough
*Attorney, Agent, or Firm*—Dana M. Schmidt

[57] ABSTRACT

There is described an aqueous ink comprising at least about 40 wt % of a humectant, and a dye or dye admixture compatible with such large amounts of humectant, that is, an admixture which does not precipitate because of such large amounts of humectant.

5 Claims, No Drawings

NON-CRUSTING INK CONTAINING LARGE AMOUNTS OF HUMECTANT

RELATED APPLICATIONS

This application is a continuation-in-part application of U.S. Ser. No. 883,414, filed on July 8, 1986 which is a continuation-in-part of Ser. No. 860,731 filed May 7, 1986.

FIELD OF THE INVENTION

This invention relates to printing inks, and more particularly to such inks as are used in drop-on-demand ink jet printers.

BACKGROUND OF THE INVENTION

Drop-on-demand printers are becoming a significant fraction of the market of ink jet printers. These printers differ from continuous jet printers in that the only time the print head ejects ink, in the case of drop-on-demand, is when printing has to take place. Also, the ejection pressure is thermally generated, rather than hydraulically generated.

Such drop-on-demand printers create new demands on inks to be used with them. Chief of these is that the ink must not crust over between actual printing events, since there is insufficient force in thermal generation to blast through the crust. Unfortunately, crusting over is much more likely to occur with drop-on-demand printers, since there is so much greater quiescent time when the print head sits idly by, exposed to atmospheric drying.

It is well known that humectants, including alkanediols such as ethylene glycol, can be added to an ink to prevent drying out or crusting of the ink. Such is commonly done, for example, in continuous jet inks. However, the amounts used in such inks do not exceed about 5 weight percent, since humectants are highly viscous and the viscosity of continuous jet inks cannot exceed about 2.0 centipoise to be effective.

It is well known that the viscosity restraints are much less for drop-on-demand ink. This would seem to suggest that the crusting problem can be solved by loading up the ink with excess, and even majority, amounts of humectants, wherein "majority" means at least 50 wt %. In fact, "excessive" amounts are recommended, in order to provide a high enough viscosity. However, such excessive amounts of humectants such as ethylene glycol, react adversely with many dyes to cause dye precipitation. Dye precipitation, like crusting, is unsatisfactory as it causes plugging of the print head.

The problem addressed by this invention is to find humectant-dye combinations which allow the ink to avoid crusting while at the same time prevent precipitation of useful amounts of the dye. One solution to this problem has been attempted in the ink used in the "Think Jet" print head available from Hewlett Packard, wherein 60 weight % diethylene glycol is present as a humectant. However, in that case the dye incompatibility that causes precipitation has been dealt with only by reducing the concentration of the dye to the point (5 wt % solids concentration) where precipitation does not occur. Such technique is a well-known approach to precipitation problems. Unfortunately, the amount of this particular black dye that is thus present is so small as to provide insufficient coloration. Thus, this black ink ends up being more grey than black. Grey inks are unsatisfactory for text printing since they reproduce poorly or not at all in electrophotographic copiers.

SUMMARY OF THE INVENTION

I have discovered humectant-dye combinations that allow high amounts of the humectant to be present without causing unwanted precipitation of useful amounts of the dye.

More specifically, there is provided an aqueous ink composition for use in a drop-on-demand printer comprising a humectant and an acid dye, a direct dye or an admixture of acid dyes or direct dyes; said humectant being (a) selected from the group consisting of ethylene glycol; 1,2-propanediol; and 1,3-propanediol; and (b) present in an amount sufficient to provide a viscosity of the ink that is from about 5.5 to about 6.5 centipoise, the amount being at least 40 wt %; the dye being sufficiently compatible with the humectant for humectancy and non-precipitation. Such dye compatibility is measured by the following test:

(1) Depositing 5 gm of the ink into an aluminum dish so as to expose to the air a surface of the ink that is about 30 $cm^2$, (2) Leaving the deposited ink so exposed for 1 month at a temperature of about 24° C., and (3) Examining the results to ascertain that the ink is totally clear of deposit or crust formation. If there is any such formation, the ink is considered a failure.

Thus, it is an advantageous feature of the invention that a non-crusting ink is provided for drop-on-demand printers which allows the use of sufficient dyes for print quality without dye precipitation in the printer.

It is a related advantageous feature of the invention that such an ink is provided which features solubility compatibility between high amounts of humectant and useful amounts of dye.

Other advantageous features will become apparent upon reference to the following description of the preferred embodiments.

DESCRIPTION OF THE PREFERRED EMBODIMENTS

I have discovered that large amounts of an alkanediol humectant, the humectant of choice, are indeed compatible with certain dyes. The compatibility allows adequate amounts of dye to be used to produce outstanding colors.

In drop-on-demand printers, the high amounts of humectant are selected to insure that the viscosity of the ink is maintained between about 5.5 and 6.5 centipoise. (All viscosities herein are measured at 24° C.) Failure to have a viscosity as high as 5.5 tends to produce undesired cross-talk, in such printers. Viscosity in excess of about 6.5 requires too much energy to eject the ink. Such viscosities of about 5.5-6.5 centipoise in turn depend on the amount of humectant that is present. Generally, the humectant should constitute at least 40 wt % of the ink to meet the viscosity demands. Exactly how much depends on the viscosity of the rest of the ink composition. This depends partly on which dye is used. In some cases, the humectant should constitute as much as 70 weight % of the ink.

The following alkanediols are examples of useful humectants for the invention: Ethylene glycol; 1,2-propanediol; and 1,3-propanediol; with ethylene glycol being most preferred. 1,4-Butanediol is unacceptable as it tends to precipitate the dye or dye admixture.

A surprising aspect of the invention is that dyes can be selected that are compatible with such large amounts of humectant. I have discovered that certain, but by no means all, direct dyes and acid dyes meet this criterion. To be "compatible", a dye or dye admixture must meet the test set forth in the Summary of the Invention. Reactive dyes are not suitable, as they tend to react with atmospheric moisture while on the printed page, and change color.

For color prints, it is necessary that a range of colors be provided. Specifically, the following colors are preferred: black, magenta, red, green, blue, yellow and cyan. Black of course is suitable for the monochrome printing so characteristic of the business office.

The following dyes and admixtures have been found to be compatible using the above-described test. The dyes are all commercially available dyes, most of which are obtained in liquid form.

| No. | Dye(s) | Color |
|---|---|---|
| (1) | Liquid Direct Blue C.I. 279 admixed with a compatible direct red | purple |
| (2) | No. (1) admixed with a liquid direct yellow dye | black |
| (3) | Acid Red 51 (also known as Food Red Dye 14) (9.8 wt % dye solids content) | magenta |
| (4) | Liquid Pontamine Fast Red 8BF (28 wt % dye solids content) admixed with liquid Pontamine Yellow RB (17 wt % dye solids content). (Both of these are direct dyes.) | red |
| (5) | Liquid Pontamine Yellow RB admixed with liquid Intrabond Turquoise GLL-IJ (34 wt % dye solids content) (direct dyes) | green |
| (6) | Liquid Intrabond Turquoise GLL-IJ admixed with liquid Pontamine Fast Red 8BF | blue |
| (7) | Liquid Intrabond Turquoise GLL-IJ admixed with Acid Red 51 noted above in No. 3. | blue |
| (8) | Liquid Pontamine Yellow RB | yellow |
| (9) | Liquid Acid Yellow 23 (11 wt % dye solids content) | yellow |
| (10) | Liquid Intrabond Turquoise GLL-IJ | cyan |

In admixture #1 and 2, the most preferred direct red and direct yellow are Direct Red C.I. 236 and Direct Yellow C.I. 107. When used in a weight ratio of blue/red/yellow=3.53/1.35/1.0, the black of No. 2 above is readily achieved.

A preferred mix for No. 4 above is red/yellow=11.5/5.3.

A preferred mix for No. 5 above is yellow/turquoise=6.0/20.0.

A preferred mix for No. 6 above is turquiose/red=18.18/0.72.

A preferred mix for No. 7 above is turquoise/red=14.8/5.2.

An additional advantage of this discovery is that the 8 colors noted above can be provided by selecting only 7 dyes. Thus, Pontamine Yellow RB is particularly useful since it appears in three of the colors (yellow, green and red).

For best dye densities on the printed page, except for yellow these liquid dye compositions constitute at least 15 wt % of the prepared ink. (The yellow dye is present at 6 wt %, since higher amounts tend to induce an orange hue.) This insures that the print is sufficiently outstanding as to be readily reproducible on electrophotographic copiers.

The following are the preferred dye-humectant compositions, using the colors noted above using the dyes as numbered above:

| No. | Color | Wt % Dye(s)* | Dye Solids wt % | Ethylene Glycol |
|---|---|---|---|---|
| 2 | Black | 25 | N.A. | 50 wt % |
| 3 | Magenta | 20 | 1.96 | 67 wt % |
| 4 | Red | 16.8 | 4.12 | 60 wt % |
| 5 | Green | 26 | 7.82 | 55 wt % |
| 7 | Blue | 20 | 5.54 | 56 wt % |
| 9 | Yellow | 6 | 1.0 | 66.5 wt % |
| 10 | Cyan | 20 | 6.8 | 52 wt % |

The remainder of the composition is water.

*These % are the weight % that the liquid dye comprises of the total ink composition.

An additional, optional addendum to the ink is a corrosion inhibitor, such as an aromatic benzotriazole, in an amount of from 0 to 0.5 wt %. Apart from this, the ink preferably lacks any further addenda, for ease in manufacture.

An ink having each of the preferred compositions noted above, including in one case the corrosion inhibitor, was tested in the humectancy test described in the Summary, and found to have no deposits, precipitates or crust formation. Thus, such dye(s) were found to not precipitate out in the presence of the large amounts of ethylene glycol. Furthermore, these inks have demonstrated outstanding resistance to crust formation and nozzle clogging on the print heads of drop-on-demand ink jet printers. Thus, the humectancy test described above has proven to be an adequate predictor of drop-on-demand printer behavior.

By comparison, the following comparative example ink failed such humectancy test because there was formed a precipitate:

An ink comprising 50 weight % ethylene glycol and C.I. Food Black 2 from Mobay Chemical Co.

The invention has been described in detail with particular reference to preferred embodiments thereof, but it will be understood that variations and modifications can be effected within the spirit and scope of the invention.

I claim:

1. An aqueous ink composition for use in a drop-on-demand printer, said composition comprising a humectant in an amount of from 50 weight percent to about 70 weight % of the total ink composition, selected from the group consisting of ethylene glycol; 1,2-propanediol; and 1,3-propanediol;

and a dye admixture of Direct Blue C.I. 279, and at least a compatible direct red dye and a compatible yellow dye selected such that the color of the combined dyes is black and when the ink is tested for humectancy and non-precipitation, by depositing 5 gm of the ink into an aluminum dish so as to expose to the air a surface of the ink that is about 30 cm$^2$, leaving the deposited ink so exposed for one month at a temperature of about 24° C., and examining the exposed ink, the ink is clear of deposits or crust formation.

2. An aqueous ink composition for use in a drop-on-demand printer, comprising
water,
ethylene glycol in an amount of from 50 to about 70 weight % of the total ink composition, a dye mixture of Direct Blue C.I. 279, a compatible direct red dye and a compatible direct yellow dye, said dyes being selected such that the color of the combined dyes is black, and when the ink is tested for humectancy and non-precipitation, by depositing 5 gm of the ink into an aluminum dish so as to expose to the air a surface of the ink that is about 30 cm$^2$, leaving the deposited ink so exposed for one month at a temperature of about 24° C., and examining the exposed ink, the ink is clear of deposits or crust formation, 3. An ink composition as defined in claim 1, or 2 wherein such alkanediol is ethylene glycol.

4. An ink composition as defined in claim 1, wherein said blue, red and yellow dyes are present in amounts that form a ratio of about 3.53/1.35/1.0, respectively.

5. An ink composition as defined in claim 1, or 2 and further including an aromatic benzotriazole as a corrosion inhibitor.

* * * * *

UNITED STATES PATENT AND TRADEMARK OFFICE
CERTIFICATE OF CORRECTION

PATENT NO. : 4,750,937
DATED : June 14, 1988
INVENTOR(S) : Raouf Botros

It is certified that error appears in the above-identified patent and that said Letters Patent are hereby corrected as shown below:

Column 6, at the end of line 2, insert --and as the sole addenda to said aqueous mixture of ethylene glycol and dye admixture, an aromatic benzotriazole as a corrosion inhibitor.--

Signed and Sealed this

First Day of November, 1988

Attest:

DONALD J. QUIGG

*Attesting Officer*      *Commissioner of Patents and Trademarks*